US012595355B2

(12) United States Patent
Tomizuka et al.

(10) Patent No.: US 12,595,355 B2
(45) Date of Patent: Apr. 7, 2026

(54) STEREOLITHOGRAPHIC RESIN COMPOSITION AND THREE-DIMENSIONAL SHAPED OBJECT

(71) Applicant: CANON KABUSHIKI KAISHA, Tokyo (JP)

(72) Inventors: Manami Tomizuka, Fukui (JP); Terunobu Saitoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1116 days.

(21) Appl. No.: 17/497,017

(22) Filed: Oct. 8, 2021

(65) Prior Publication Data

US 2022/0025157 A1     Jan. 27, 2022

Related U.S. Application Data

(63) Continuation of application No. PCT/JP2020/016436, filed on Apr. 14, 2020.

(30) Foreign Application Priority Data

Apr. 17, 2019    (JP) ................................. 2019-078623
Feb. 21, 2020    (JP) ................................. 2020-028012

(51) Int. Cl.
| | |
|---|---|
| *C08K 9/02* | (2006.01) |
| *B29C 64/124* | (2017.01) |
| *B29K 105/16* | (2006.01) |
| *B29K 505/10* | (2006.01) |
| *B33Y 10/00* | (2015.01) |
| *B33Y 70/10* | (2020.01) |
| *B33Y 80/00* | (2015.01) |
| *C08K 3/08* | (2006.01) |
| *C08K 3/38* | (2006.01) |
| *C08L 63/00* | (2006.01) |

(52) U.S. Cl.
CPC ................ *C08K 9/02* (2013.01); *B33Y 10/00* (2014.12); *B33Y 70/10* (2020.01); *B33Y 80/00* (2014.12); *C08K 3/08* (2013.01); *C08K 3/38* (2013.01); *C08L 63/00* (2013.01); *B29C 64/124* (2017.08); *B29K 2105/16* (2013.01); *B29K 2505/10* (2013.01); *C08K 2003/0806* (2013.01); *C08K 2003/0831* (2013.01); *C08K 2003/085* (2013.01); *C08K 2003/385* (2013.01); *C08K 2201/003* (2013.01)

(58) Field of Classification Search
None
See application file for complete search history.

(56) References Cited

U.S. PATENT DOCUMENTS

| | | | |
|---|---|---|---|
| 9,228,073 | B2 | 1/2016 | He et al. |
| 9,951,198 | B2 | 4/2018 | He et al. |
| 10,526,469 | B2 | 1/2020 | He et al. |
| 2014/0377572 | A1* | 12/2014 | Gaynes .................... B32B 9/00 |
| | | | 428/688 |
| 2015/0337132 | A1 | 11/2015 | Van Der Burgt |
| 2018/0067374 | A1 | 3/2018 | Xi |
| 2020/0102442 | A1 | 4/2020 | He et al. |
| 2021/0189097 | A1 | 6/2021 | He et al. |
| 2022/0363958 | A1* | 11/2022 | Shirakawa ............. C09J 175/16 |

FOREIGN PATENT DOCUMENTS

| | | |
|---|---|---|
| JP | 7-205157 A | 8/1995 |
| JP | 2662934 B2 | 10/1997 |
| JP | 10-306204 A | 11/1998 |
| JP | 2016-503084 A | 2/2016 |
| JP | 6056032 B2 | 1/2017 |
| JP | 2018-002916 A | 1/2018 |
| JP | 2018-118413 A | 8/2018 |
| JP | 2018-176504 A | 11/2018 |
| KR | 101651649 B1 * | 8/2016 |
| WO | 2020/213606 A1 | 10/2020 |

OTHER PUBLICATIONS

Kim et al., KR-101651649-B1, Aug. 29, 2016 (machine translation) (Year: 2016).*
Akaike, JP2018002916, Jan. 11, 2018 (machine translation) (Year: 2018).*
JP 6056032, U.S. Pat. Nos. 9,228,073 B2, 9,951,198 B2, 10,526,469 B2, 2020/0102442 A1, 2021/0189097 A1.
JP 2016-503084, 2015/0337132 A1.
International Search Report in International Application No. PCT/JP2020/016436 (Jun. 2020).
International Preliminary Report on Patentability in International Application No. PCT/JP2020/016436 (Oct. 2021).

* cited by examiner

*Primary Examiner* — Cheng Yuan Huang
(74) *Attorney, Agent, or Firm* — Venable LLP

(57)     ABSTRACT

Provided is a stereolithographic resin composition that suppresses sedimentation of the filler during shaping, has good handleability, and has high thermal conductance of the cured product. A stereolithographic resin composition containing a photocurable resin and a filler, wherein the filler is a metal-coated particle having a base particle including a polymer material and having a metal layer coating the surface of the base particle, and a density of the metal-coated particle is 1.5 $g/cm^3$ to 4.0 $g/cm^3$.

16 Claims, No Drawings

STEREOLITHOGRAPHIC RESIN COMPOSITION AND THREE-DIMENSIONAL SHAPED OBJECT

CROSS-REFERENCE TO RELATED APPLICATIONS

This application is a Continuation of International Patent Application No. PCT/JP2020/016436, filed Apr. 14, 2020, which claims the benefit of Japanese Patent Application No. 2019-078623, filed Apr. 17, 2019, and Japanese Patent Application No. 2020-028012, filed Feb. 21, 2020, all of which are hereby incorporated by reference herein in their entirety.

BACKGROUND OF THE INVENTION

Field of the Invention

The present invention relates to a stereolithographic resin composition capable of providing a cured product excellent in thermal conductance, and particularly relates to a stereolithographic resin composition containing a filler and suppressing sedimentation of the filler.

Description of the Related Art

In recent years, an optical three-dimensional shaping method for three-dimensionally shaping a photocurable material based on three-dimensional (3D) data has been widely employed at manufacturing sites and the like as a new method for replacing cutting processing and molding processing since a target three-dimensional shaped object can be manufactured with good accuracy. Furthermore, from the viewpoint of high shaping accuracy, production time, and cost, attempts have been made to replace an injection molding mold with a resin mold manufactured by the optical three-dimensional shaping method and to use the resin mold for trial production and the like.

As the optical three-dimensional shaping method, there are a pull-down method and a pull-up method. In the pull-down method, after ultraviolet light is selectively irradiated onto the liquid surface of a photocurable material to cure the photocurable material in a desired pattern, the cured layer is pulled down into the material, the photocurable material for one layer is supplied thereon, and the step of curing the photocurable material in the same manner as described above is repeated to obtain a three-dimensional shaped object. In the pull-up method, curing is performed by irradiating ultraviolet light from the bottom surface side of a container containing a photocurable material, the cured layer is pulled up and peeled off from the bottom surface, the photocurable material for one layer is poured between the cured layer and the bottom surface, and curing is repeatedly performed in the same manner as described above for laminating. Both optical three-dimensional shaping methods can easily yield a three-dimensional shaped object having a complicated shape in a relatively short time.

As the photocurable material, a photocurable material containing a radically polymerizable organic compound, a cationically polymerizable organic compound, or both is used. It is desirable that such photocurable material has a low viscosity so that it is quickly supplied to cure the next layer as described above. In addition, because the shaped object is required to have excellent dynamic properties, durability, moisture resistance, thermal properties, and the like according to the application of the shaped object, a composition to which a filler corresponding to the required properties is added is used.

For example, when a mold for an injection molding mold or the like is replaced with a resin mold produced by an optical three-dimensional shaping method, it is necessary to release heat from the inside of the mold to the outside, and the resin mold is therefore desired to have properties of high thermal conductivity. Japanese Patent Application Laid-Open No. H07-205157 describes that a resin mold including a photocurable resin obtained by adding aluminum borate and glass beads to an acrylic compound is used to improve thermal conductive properties of the resin mold. In addition, Japanese Patent Application Laid-Open No. H10-306204 describes that a cured molded product excellent in thermal conductive properties is obtained by using a curable epoxy resin composition obtained by adding a metal powder to an epoxy compound.

However, in the photocurable resin to which glass beads are added as described in Japanese Patent Application Laid-Open No. H07-205157, the thermal conductivity of the glass beads is low, and it has been difficult to use the photocurable resin in applications where the thermal conductivity is required. In addition, when a metal powder is added to a composition as a filler as in Japanese Patent Application Laid-Open No. H10-306204, there has been a problem that, because the filler sediments during shaping, handleability is poor, and further, a concentration gradient is formed in the filler in the cured product, and thermal conductivity in the laminating direction cannot be obtained.

In view of the above problems, an object of the present invention is to provide a stereolithographic resin composition that suppresses sedimentation of a filler during shaping, has good handleability, and yields a cured product having high thermal conductance, and a three-dimensional shaped object that is a cured product thereof.

SUMMARY OF THE INVENTION

A first aspect of the present invention is a stereolithographic resin composition including at least a photocurable resin and a filler, wherein the filler is a metal-coated particle having a base particle including a polymer material, and a metal layer coating the surface of the base particle. A second aspect of the present invention is an article that is a cured product of the stereolithographic resin composition.

Further features of the present invention will become apparent from the following description of exemplary embodiments.

DESCRIPTION OF THE EMBODIMENTS

The stereolithographic resin composition of the present invention is a stereolithographic resin composition characterized by containing a photocurable resin and a filler, wherein the filler is a metal-coated particle having a base particle including a polymer material, and a metal layer coating the surface of the base particle. In addition, the three-dimensional shaped object of the present invention is a cured product of the stereolithographic resin composition.

Hereinafter, embodiments of the present invention will be described, but the present invention should not be limited to the following embodiments.

Filler

The filler of the present invention is characterized by being a metal-coated particle having a polymer material as a base particle and a metal layer on the surface of the base particle.

The polymer materials that constitute the base particle include polyethylene, polypropylene, polystyrene, a styrene-acrylonitrile resin, an ABS resin, a (meth)acrylic resin, a PET resin, a PVA resin, polyamide, polyacetal, polycarbonate, a PBT resin, polyphenylene oxide, polyphenylene sulfide, polyimide, polyetherimide, polysulfone, polyamideimide, a phenol resin, a urea resin, a melamine resin, polyester, polyurethane, a silicone resin, an epoxy resin, cellulose, and a polymer alloy of resins selected from the above group, but a (meth)acrylic resin, polyamide, polyimide, a melamine resin, polystyrene, an ABS resin, polypropylene, polyphenylene oxide or the like is preferably used from the viewpoint of density, ease of coating, and the like.

The metal layer may be a metal layer capable of coating the base particle, but preferably contains gold, silver, copper, or the like from the viewpoint of thermal conduction. In addition, the metal layer may be a multilayer, and the base particle may be coated with a metal such as nickel, and then further coated with another metal such as gold, silver, or copper. Here, in the present invention, a metal layer containing certain metals is both a metal layer containing a plurality of metals in one metal layer and a metal layer formed by coating a layer formed of a single metal with a layer formed of another single metal.

The metal-coated particle has a density of 1.5 g/cm$^3$ to 4.0 g/cm$^3$ from the viewpoint of sedimentation properties and dispersibility in the stereolithographic resin composition.

The volume average particle diameter of the metal-coated particle is preferably 0.5 μm to 30 μm, and particularly preferably 2 μm to 20 μm. If the volume average particle diameter of the metal-coated particle is smaller than 2 μm, the volume of the metal with respect to the volume of the base particle increases, so that the density of the metal-coated particle increases and the dispersibility tends to deteriorate. In addition, if the volume average particle diameter of the metal-coated particle is larger than 20 μm, the metal-coated particle relatively large with respect to the film thickness are likely to be exposed on the surface during stereolithography, so that the lamination pitch cannot be narrowed during shaping, and thus shaping accuracy tends to decrease. Here, the volume average particle diameter of the metal-coated particle can be measured using a laser diffraction type particle size distribution measuring apparatus.

The content of the metal-coated particle is preferably 4 mass % to 65 mass %, and more preferably 4 mass % to 60 mass % with respect to the total mass of the resin composition. If the content of the metal-coated particle is small, the thermal conductance decreases, and if the content is large, not only the strength of the cured product decreases, but also the viscosity of the stereolithographic resin composition increases and the fluidity decreases, so that shaping becomes difficult.

One type of metal-coated particle may be used alone, or two or more types having different particle sizes and materials may be used in combination. The average thickness (average plating thickness) of the metal layer is preferably 50 nm to 500 nm. In consideration of an increase in poor coating sites of the metal-coated particle and a decrease in dispersibility due to an increase in the density of the particles, the average thickness of the metal layer is more preferably 80 nm to 200 nm. The average thickness of the metal layer can be calculated from the density of the metal layer, the mass of the metal layer determined from the difference between the mass of N (N≥100) metal-coated particles and the mass of N particles from which the metal layer has been removed, and the surface area of the particle calculated from the volume average particle diameter of the particle.

Additives

In addition to the metal-coated particle, a boron nitride powder may be added to the stereolithographic resin composition of the present invention. In particular, the thermal conductivity of the cured product is dramatically improved by using copper-coated particle having a metal layer of copper and boron nitride in combination. It is not clear why the thermal conductivity of the cured product is thus improved, but it is presumed that some interaction occurs between the surface of the copper-coated particle and the surface of boron nitride, which facilitates the thermal conduction.

The content of boron nitride is particularly preferably 3:97 to 66:34 in terms of mass ratio of metal-coated particle: boron nitride for improving thermal conductivity. Methods for analyzing the mass ratio between the metal-coated particle and boron nitride of the stereolithographic resin composition include a method in which a resin component and a filler component are separated from the stereolithographic resin composition by centrifugation, a filter, or the like, and then the component ratio is analyzed by energy dispersive X-ray analysis or the like. Methods for analyzing the mass ratio of the metal-coated particle and boron nitride from the shaped object include a method of analyzing components of residues of metal-coated particle, boron oxide, and the like obtained after heat treatment of the shaped object. However, the method is not limited to these methods as long as the mass ratio of the metal-coated particle and boron nitride contained in the stereolithographic resin composition or the shaped object can be obtained.

The shape of boron nitride is not particularly limited, but due to the nature of boron nitride, plate-like particle has high thermal conductivity and are suitable. The average particle size is not particularly limited, but is preferably 500 nm to 50.0 μm in consideration of the viscosity of the stereolithographic resin composition and availability. In addition, in consideration of the dispersion stability in the stereolithographic resin composition, the average particle size is more preferably 500 nm to 20.0 μm.

Photocurable Resin

The photocurable resin used in the present invention may be any resin as long as it can cure the stereolithographic resin composition by irradiation of an active energy ray (ultraviolet ray, electron beam, X-ray, radiation, high frequency, or the like). Specifically, various resins such as a polymerizable vinyl-based compound, acryl-based compound, and epoxy-based compound can be selected. In addition, monomers or oligomers of a monofunctional compound or a polyfunctional compound are used. These monofunctional compound and polyfunctional compound are not particularly limited. Typical examples of a photocurable resin are listed below.

Vinyl-based compounds include vinylpyrrolidone, vinyl acetate, styrene, 4-vinyltoluene, and the like.

Acryl-based compounds include 2-ethylhexyl (meth) acrylate, 2-hydroxyethyl (meth)acrylate, 2-hydroxypropyl (meth)acrylate, lauryl (meth)acrylate, stearyl (meth)acrylate, isooctyl (meth)acrylate, tetrahydrofurfuryl (meth)acrylate, isobornyl (meth)acrylate, benzyl (meth)acrylate, ethylene glycol di(meth)acrylate, propylene glycol di(meth) acrylate, trimethylol propane tri(meth)acrylate, ditrimethylol propane tetra(meta)acrylate, pentaerythritol tetra(meth)acrylate, dipentaerythritol tri(meth)acrylate, dipentaerythritol penta(meth)acrylate, dipentaerythritol hexa(meth)acrylate, phenoxyethyl (meth)acrylate, phenoxypolyethylene glycol (meta)acrylate, benzyl (meth)acrylate, tetrahydrofurfuryl (meth)acrylate, morpholine (meth)acrylate, phenylglycidyl (meth)acrylate, 2-hydroxypropyl (meth)acrylate, lauryl (meth)acrylate, isodecyl (meth)acrylate, stearyl (meth)acrylate, isooctyl (meth)acrylate, tridecyl (meth)acrylate, ethoxy diethylene glycol (meth)acrylate, methoxyditripropylene glycol (meth)acrylate, tricyclodecane (meth)acrylate, isobornyl (meth)acrylate, dicyclopentadieneoxyethyl (meth)acrylate, dicyclopentenyl acrylate, dicyclopentenyloxyethyl acrylate, dicyclopentenyloxy methacrylate, dicyclopentanyl acrylate, dicyclopentanyl methacrylate, 1-adamantyl acrylate, 2-methyl-2-adamantyl acrylate, 2-ethyl-2-adamantyl acrylate, 1-adamantyl methacrylate, cyclohexane-1,4-dimethanol di(meth)acrylate, cyclohexane-1,3-dimethanol di(meth)acrylate, tricyclodecanedimethylol di(meth)acrylate, dioxane glycol di(meth) acrylate, neopentyl glycol di(meth)acrylate, dicyclopentanyl di(meth)acrylate, alkylene oxide modified 1,6-hexanediol di(meth)acrylate, neopentyl glycol di(meth)diacrylate, alkylene oxide modified neopentyl glycol di(meth)diacrylate, hydroxypivalic acid neopentyl glycol di(meth)acrylate, 1,9-nonanediol di(meth)acrylate, polyethylene glycol di(meth)acrylate, polypropylene glycol di(meth)acrylate, ethylene oxide-modified bisphenol A-type di(meth)acrylate, and the like.

Epoxy-based compounds include hydrogenated bisphenol A diglycidyl ether, hydrogenated bisphenol F diglycidyl ether, hydrogenated bisphenol AD diglycidyl ether, hydrogenated bisphenol Z diglycidyl ether, cyclohexanedimethanol diglycidyl ether, tricyclodecanedimethanol, diglycidyl ether, 3,4-epoxycyclohexylmethyl-3', 4'-epoxycyclohexane carboxylate, 3,4-epoxy-1-methylcyclohexyl-3,4-epoxy-1-methylcyclohexanecarboxylate, 6-methyl-3,4-epoxycyclohexylmethyl-6-methyl-3,4-epoxycyclohexanecarboxylate, 3,4-epoxy-3-methylcyclohexylmethyl-3,4-epoxy-3-methylcyclohexanecarboxylate, 3,4-epoxy-5-methylcyclohexylmethyl-3,4-epoxy-5-methylcyclohexanecarboxylate, 2-(3,4-epoxycyclohexyl-5,5-spiro-3,4-epoxy)cyclohexanemetadioxane, bis(3,4-epoxycyclohexylmethyl)adipate, 3,4-epoxy-6-methylcyclohexylcarboxylate, dicyclopentadiene diepoxide, ethylenebis(3,4-epoxycyclohexanecarboxylate), dioctylepoxyhexahydrophthalate, di-2-ethylhexyl epoxyhexahydrophthalate, ε-caprolactone modified 3',4'-epoxycyclohexylmethyl 3,4-epoxycyclohexanecarboxylate, 1,2-epoxy-4-(2-oxyl anyl)cyclohexane adduct of 2,2-bis (hydroxymethyl)-1-butanol, bis(3,4-epoxycyclohexyl) methane, 2,2-bis(3,4-epoxycyclohexyl)propane, 1,1-bis(3,4-epoxycyclohexyl)ethane, alpha-pinene oxide, campholene aldehyde, limonene monoxide, limonene dioxide, 4-vinylcyclohexene monoxide, 4-vinylcyclohexene dioxide, 3-hydroxymethyl-3-methyloxetane, 3-hydroxymethyl-3-ethyloxetane, 3-hydroxymethyl-3-propyloxetane, 3-hydroxymethyl-3-normalbutyloxetane, 3-hydroxymethyl-3-propyloxetane, and the like.

The above polymerizable compounds can be used alone or in combination of two or more thereof, but it is more preferable to use the acryl-based compound and the epoxy-based compound in combination. Because the acryl-based compound has a high reaction rate and yields a cured product having high mechanical strength, while the epoxy-based compound has a low viscosity and yields a polymer having a small shrinkage strain, the viscosity of the stereolithographic resin composition is adjusted by combining both compounds, and a cured product having high mechanical strength and high shaping accuracy can be quickly obtained by polymerization.

Polymerization Initiator

The stereolithographic resin composition of the present invention may contain a polymerization initiator. Polymerization initiators that generate radical species by light irradiation include, but are not limited to, 2-benzyl-2-dimethylamino-1-(4-morpholinophenyl)-1-butanone, 1-hydroxycyclohexyl phenyl ketone, 2-hydroxy-2-methyl-1-phenyl-propane-1-one, bis(2,4,6-trimethylbenzoyl)-phenylphosphine oxide, 4-phenylbenzophenone, 4-phenoxybenzophenone, 4,4'-diphenylbenzophenone, 4,4'-diphenoxybenzophenone, and the like.

In addition, polymerization initiators that generate a cationic species by light irradiation include, but are not limited to, iodonium(4-methylphenyl) [4-(2-methylpropyl)phenyl]-hexafluorophosphate as a suitable polymerization initiator.

Furthermore, polymerization initiators that generate radical species by heat include, but are not limited to, azo compounds such as azobisisobutylnitrile (AIBN), and peroxides such as benzoyl peroxide, tert-butyl peroxypivalate, tert-butyl peroxyneohexanoate, tert-hexylperoxyneohexanoate, tert-butyl peroxyneodecanoate, tert-hexylperoxyneodecanoate, cumyl peroxyneohexanoate, and cumyl peroxyneodecanoate.

When the epoxy compound is added, a photoacid generator or a photobase generator may be added to the stereolithographic resin composition to promote the polymerization reaction of the epoxy or oxetane compound. The photoacid generators include, but are not limited to, triarylsulfonium hexafluoroantimonate, triphenylphenacylphosphonium tetrafluoroborate, triphenylsulfonium hexafluoroantimonate, bis-[4-(diphenylsulfonio)phenyl]sulfide bisdihexafluoroantimonate, bis-[4-(di4'-hydroxyethoxyphenyl sulfonio)phenyl] sulfide bisdihexafluoroantimonate, bis-[4-(diphenyl sulfonio)phenyl] sulfide bisdihexafluorophosphate, and diphenyliodonium tetrafluoroborate.

The polymerization initiator contained in the stereolithographic resin composition may be used alone or in combination of two or more thereof. In addition, the addition ratio of the polymerization initiator to the stereolithographic resin composition may be appropriately selected according to the light irradiation amount, the wavelength of the irradiation light, and the temperature of additional heating, or may be adjusted according to the target average molecular weight of a polymer to be obtained.

Optional Component

The stereolithographic resin composition of the present invention may contain optional components such as a polymerization inhibitor, a photosensitizer, a light resistance stabilizer, a heat resistance stabilizer, an antioxidant, a mold releasing agent, an antifungal agent, a dispersant, a surface modifier, an antifoaming agent, a leveling agent, a thickener, a flame retardant, a dye, a pigment, a reactive diluent, and a filler in the range where the viscosity of the stereolithographic resin composition, sedimentation properties of the filler contained therein, and the mechanical properties and thermal conductivity of the cured product are not significantly deteriorated. The addition amount of the optional component varies depending on each optional component, but the total amount of the optional components is preferably 0.01 wt % to 10.0 wt % with respect to the total amount of the stereolithographic resin composition. In order to sufficiently exert the effect of the optional components and not to significantly deteriorate the mechanical properties and thermal conductivity of the cured product, the total amount of the optional components is more preferably 0.03 wt % to 7.0 wt % with respect to the total amount of the stereolithographic resin composition.

Preparation Method

The method for preparing the stereolithographic resin composition of the present invention is not particularly limited, and the stereolithographic resin composition may be prepared by any method as long as it is a method for obtaining a composition in which a photocurable resin, a filler, and other components are uniformly mixed.

Shaping Method

In order to perform optical three-dimensional shaping using the stereolithographic resin composition of the present invention, any of conventionally known optical three-dimensional shaping methods and apparatuses can be used. Examples include a method in which, based on shape data of a three-dimensional object as a shaping target, an active energy ray is selectively irradiated to a layer of the stereolithographic resin composition so as to obtain a cured layer having a desired pattern, thus forming a cured layer, then a layer of the stereolithographic resin composition being uncured is supplied in contact with the cured layer, and a laminating operation of similarly irradiating an active energy ray to form a new cured layer continuous with the cured layer is repeated to finally obtain a three-dimensional shaped object of a target article.

The active energy rays can include an ultraviolet ray, an electron beam, an X-ray, a radiation, a high frequency, and the like. Among them, an ultraviolet ray having a wavelength of 300 nm to 400 nm is preferably used from an economical viewpoint. As a light source for the above, an ultraviolet laser, a high-pressure mercury lamp, an ultra-high pressure mercury lamp, a low-pressure mercury lamp, a xenon lamp, a halogen lamp, a metal halide lamp, an ultraviolet light emitting diode (LED), an ultraviolet fluorescent lamp, or the like can be used. Examples of the ultraviolet laser include a semiconductor-excited solid-state laser, an Ar laser, and a He-Cd laser.

The three-dimensional shaped object obtained using the stereolithographic resin composition of the present invention may be used as it is without being subjected to a post-curing treatment or a heat treatment, but it is preferable to use the three-dimensional shaped object after being subjected to a post-curing treatment by irradiation with an ultraviolet ray and/or after being subjected to a heat treatment.

The stereolithographic resin composition of the present invention can be widely used in the field of optical three-dimensional shaping. Typical application fields thereof include a shape confirmation model for verifying an appearance design in the middle of design, a functional test model for checking the functionality of a part, a master model for producing a cast, a master model for producing a mold, and a direct mold for a prototype mold. In particular, the stereolithographic resin composition of the present invention is useful in producing a shape confirmation model or a functional test model of a precise part or the like. More specifically, the stereolithography resin composition of the present invention can be effectively used for, for example, applications such as models, resin molds, processing of articles such as precision parts, electrical and electronic parts, furniture, building structures, automobile parts, and various containers, and castings.

Since the stereolithographic resin composition of the present invention contains resin particle coated with a metal (metal-coated particle) as a filler, the density is low, the filler is less likely to sediment during shaping, and the handleability is good, as compared with the case where the filler is a metal particle. In addition, in the cured product of the stereolithographic resin composition of the present invention, good thermal conductance is obtained due to the metal layer of the metal-coated particle as a filler. Therefore, when the stereolithographic resin composition of the present invention is used, it is possible to obtain an article having isotropic high thermal conductance regardless of the lamination direction and the plane direction without performing stirring work for preventing sedimentation of the filler, and work efficiency is improved.

EXAMPLES

Hereinafter, the present invention will be specifically described with reference to Examples, but the present invention should not be limited to these Examples. Note that "part" and "%" in the following description are on a mass basis unless otherwise specified.

Examples 1 to 15

Into an airtight container, 57.8 parts of 3,4-epoxycyclohexylmethyl 3',4'-epoxycyclohexanecarboxylate (manufactured by Wako Pure Chemical Industries, Ltd.), 18.7 parts of neopentyl glycol diglycidyl ether (manufactured by Sigma-Aldrich Co. LLC.), 14.9 parts of A-TMPT (manufactured by Shin-Nakamura Chemical Co., Ltd.), 0.9 parts of IRGA-CURE184 (manufactured by BASF SE), 0.2 parts of diphenyl(2,4,6-trimethylbenzoyl)phosphine oxide (manufactured by Tokyo Chemical Industry Co., Ltd.), and 7.5 parts of a 50% propylene carbonate solution of a triarylsulfonium hexafluorophosphate mixture (manufactured by Sigma-Aldrich Co. LLC.) were weighed. The mixture was mixed with a mix rotor (VMRC-5 manufactured by AS ONE Corporation) for 2 hours to prepare a photocurable resin.

The photocurable resin, the following metal-coated particles A to E, and boron nitride were weighed and mixed at ratios shown in Table 1 to obtain stereolithographic resin compositions, respectively. The obtained stereolithographic resin compositions were evaluated according to an evaluation method for filler sedimentation properties and an evaluation method for thermal conductance described below. The evaluation results are shown in Table 1.

A: Copper plated particle (base particle, acrylic resin); volume average particle diameter, 20 μm; density, 1.8 g/cm$^3$ (average plating thickness, 100 nm)

B: Copper plated particle (base particle, acrylic resin); volume average particle diameter, 5 μm; density, 2.6 g/cm$^3$ (average plating thickness, 100 nm)

C: Silver-coated powder (base particle, polymer particle); volume average particle diameter, 10 μm; density, 2.0 g/cm³; manufactured by Mitsubishi Materials Electronic Chemicals Co., Ltd.

D: Silver-coated powder (base particle, polymer particle); volume average particle diameter, 10 μm; density, 2.7 g/cm³; manufactured by Mitsubishi Materials Electronic Chemicals Co., Ltd.

E: Silver-coated powder (base particle, polymer particle); volume average particle diameter, 10 μm; density, 3.9 g/cm³; manufactured by Mitsubishi Materials Electronic Chemicals Co., Ltd.

Comparative Examples 1 and 2

In the same manner as in Examples 1 to 15 except that the metal-coated particle was changed to the following silica and a nickel-core silver-plated particle, stereolithographic resin compositions were obtained by mixing at ratios shown in Table 1, respectively. The obtained stereolithographic resin compositions were evaluated according to the evaluation method for filler sedimentation properties and the evaluation method for thermal conductance described below. The evaluation results are shown in Table 1.

Silica: trade name, "SB-300"; volume average particle diameter, 7 μm; density, 2.2 g/cm³; manufactured by Miyoshi Kasei, Inc.

Nickel-core silver plated particle: trade name, "TFM-NOSP"; volume average particle diameter, 7 μm; density, 9.1 g/cm³; manufactured by Toyo Aluminium K.K.

Comparative Example 3

The photocurable resin prepared in Examples and the metal-coated particle F were weighed and mixed at a ratio shown in Table 1 to obtain a stereolithographic resin composition. The obtained stereolithographic resin compositions were evaluated according to an evaluation method for filler sedimentation properties and an evaluation method for thermal conductance described below. The evaluation results are shown in Table 1.

F: Copper plated particle (base particle, acrylic resin); volume average particle diameter, 20 μm; density, 4.1 g/cm³ (average plating thickness, 1000 nm)

Comparative Example 4

The photocurable resin prepared in Examples and the metal-coated particle G were weighed and mixed at a ratio shown in Table 1 to obtain a stereolithographic resin composition. The obtained stereolithographic resin compositions were evaluated according to an evaluation method for filler sedimentation properties and an evaluation method for thermal conductance described below. The evaluation results are shown in Table 1.

G: Copper plated particle (base particle, acrylic resin); volume average particle diameter, 20 μm; density, 1.4 g/cm³ (average plating thickness, 540 nm); manufactured by Teikoku-ion CO.,LTD.

(1) Evaluation Method for Filler Sedimentation Properties

The stereolithographic resin compositions were placed in an airtight container and allowed to stand at room temperature, and after 24 hours, a resin composition in which deposition of a filler was not confirmed was rated as good, and a resin composition in which deposition of a filler was confirmed was rated as poor.

(2) Evaluation Method for Thermal Conductivity

A spacer having a thickness of 100 μm was placed on a quartz plate to which a release sheet was attached, into which a stereolithographic resin composition was poured, sandwiched with a quartz plate to which the release sheet was attached, and fixed. After applicating ultraviolet light with 365 nm and 10 mW for 120 seconds each on the front and back surfaces, the cured product was released from the quartz plates to obtain a film. This film was heated in an oven at 50° C. for 1 hour, at 100° C. for 1 hour, and at 180° C. for 1 hour to obtain a sample for evaluation.

The sample for evaluation was measured with a periodic heating method thermal diffusivity measuring apparatus (trade name, "FTC-1"; manufactured by ADVANCE RIKO, Inc.), and the obtained thermal diffusivity was converted to obtain the thermal conductivity.

(3) Overall Rating

The overall rating was determined according to the following criteria.

A: Good in sedimentation property evaluation, thermal conductivity ≥1.0 W/mK

B: Good in sedimentation property evaluation, thermal conductivity ≥0.5 W/mK

C: Poor in sedimentation property evaluation, and/or thermal conductivity <0.5 W/mK

TABLE 1

| | | Example | | | | | | | | | | | | | | | Comparative example | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 1 | 2 | 3 | 4 |
| Photocurable resin | | 60 | 50 | 60 | 60 | 50 | 60 | 50 | 60 | 50 | 60 | 60 | 60 | 52 | 50 | 56 | 41 | 35 | 60 | 60 |
| Filler | Metal-coated particle A | 40 | 50 | — | — | — | — | — | — | — | 4 | 10 | 20 | 24 | 25 | — | — | — | — | — |
| | Metal-coated particle B | — | — | 40 | — | — | — | — | — | — | — | — | — | — | — | — | — | — | — | — |
| | Metal-coated particle C | — | — | — | 40 | 50 | — | — | — | — | — | — | — | — | — | 22 | — | — | — | — |
| | Metal-coated | — | — | — | — | — | 40 | 50 | — | — | — | — | — | — | — | — | — | — | — | — |

TABLE 1-continued

|  |  | Example | | | | | | | | | | | | | | | Comparative example | | | |
|---|---|---|---|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 | 15 | 1 | 2 | 3 | 4 |
|  | particle D Metal-coated particle E | — | — | — | — | — | — | — | 40 | 50 | — | — | — | — | — | — | — | — | — | — |
|  | Metal-coated particle F | — | — | — | — | — | — | — | — | — | — | — | — | — | — | — | — | 40 | — | — |
|  | Metal-coated particle G | — | — | — | — | — | — | — | — | — | — | — | — | — | — | — | — | — | — | 40 |
| Additive | Boron nitride | — | — | — | — | — | — | — | — | — | 36 | 30 | 20 | 24 | 25 | 22 | — | — | — | — |
| Filler | Silica | — | — | — | — | — | — | — | — | — | — | — | — | — | — | — | 59 | — | — | — |
|  | Nickel-core silver-plated particle | — | — | — | — | — | — | — | — | — | — | — | — | — | — | — | 65 | — | — | — |
|  | Sedimentation property evaluation | ○ | ○ | ○ | ○ | ○ | ○ | ○ | ○ | ○ | ○ | ○ | ○ | ○ | ○ | ○ | X | X | X | ○ |
|  | Thermal conductivity evaluation [W/mK] | 0.6 | 0.8 | 0.6 | 0.6 | 0.8 | 0.5 | 0.8 | 0.7 | 1.1 | 1.0 | 1.0 | 1.0 | 1.2 | 1.2 | 1.0 | 0.4 | 0.6 | 0.6 | 0.3 |
|  | Overall rating | B | B | B | B | B | B | B | B | A | A | A | A | A | A | A | C | C | C | C |

As is apparent from the evaluation results shown in Table 1, the stereolithographic resin compositions of Examples 1 to 15 balanced the sedimentation properties of the filler and the thermal conductivity in the laminating direction of the cured product as compared with the stereolithographic resin compositions of Comparative Examples 1 to 4.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A resin composition comprising a photocurable resin, a filler and boron nitride,
   wherein the filler is a metal-coated particle having a base particle including a polymer material, and a metal layer coating a surface of the base particle,
   a density of the metal-coated particle is 1.5 g/cm³ to 4.0 g/cm³,
   the photocurable resin contains an epoxy-based compound and an acryl-based compound,
   a content of the photocurable resin is 50% by mass to 60% by mass and wherein a mass ratio of the metal-coated particle to the boron nitride, the metal-coated particle: the boron nitride, is 3:97 to 66:34.

2. The resin composition according to claim 1, wherein the metal-coated particle has a volume average particle diameter of 0.5 μm to 30 μm.

3. The resin composition according to claim 1, wherein a content of the metal-coated particle is 4% by mass to 25% by mass.

4. The resin composition according to claim 1, wherein the polymer material is selected from a group consisting of an acrylic resin, methacrylic resin, polyamide, polyimide, a melamine resin, polystyrene, an ABS resin, polypropylene, and polyphenylene oxide.

5. The resin composition according to claim 1, wherein the metal layer contains any of gold, silver, and copper.

6. The resin composition according to claim 1, wherein the boron nitride has a shape of a plate-shaped particle.

7. The resin composition according to claim 1, wherein the metal layer contains copper.

8. The resin composition according to claim 1, wherein the polymer material is an acrylic resin.

9. The resin composition according to claim 1, wherein the polymer material is an acrylic resin, and the metal layer contains copper.

10. The resin composition according to claim 1, wherein the photocurable resin contains more of the epoxy-based compound than the acryl-based compound.

11. The resin composition according to claim 10, wherein the polymer material is an acrylic resin.

12. The resin composition according to claim 1, wherein the content of the metal-coated particle is 40% by mass to 50% by mass.

13. The resin composition according to claim 1, wherein the content of the boron nitride is 20% by mass to 36% by mass.

14. An article that is a cured product of the resin composition according to claim 1.

15. A method for manufacturing an article, comprising:
   selectively irradiating an active energy ray to a layer of a stereolithographic resin composition to form a cured layer;
   supplying a layer of the stereolithographic resin composition being uncured in contact with the cured layer; and
   selectively irradiating the active energy ray to the layer of the stereolithographic resin composition being uncured to form a new cured layer continuous with the cured layer,
   wherein the stereolithographic resin composition is the resin composition according to claim 1, and the active energy ray is irradiated based on shape data of the article to be manufactured.

16. The method for manufacturing an article according to claim 15, wherein the active energy ray is an ultraviolet ray having a wavelength of 300 nm to 400 nm.

* * * * *